Oct. 21, 1947.   J. W. WHITE   2,429,440
PRESSURE RESPONSIVE SWITCH
Filed July 30, 1943
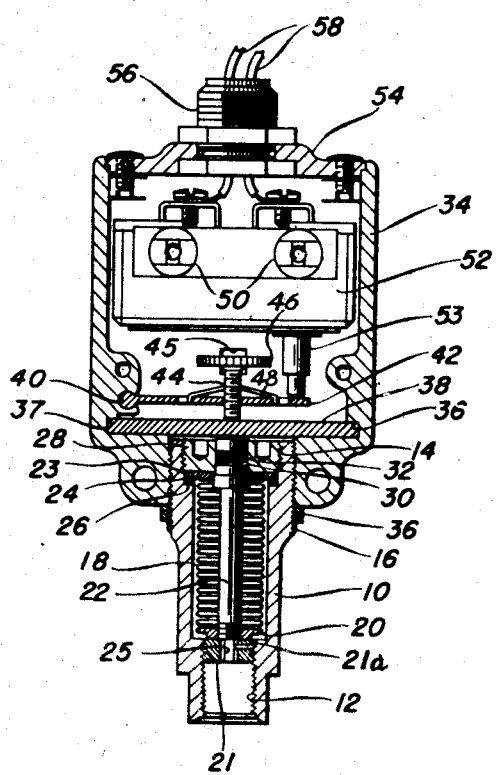
INVENTOR.
JOHN W. WHITE
BY  H. W. Brelsford
ATTORNEY Patented Oct. 21, 1947

2,429,440

UNITED STATES PATENT OFFICE 2,429,440

PRESSURE RESPONSIVE SWITCH

John W. White, North Hollywood, Calif., assignor, by mesne assignments, to Bendix Aviation Corporation, South Bend, Ind., a corporation of Delaware Application July 30, 1943, Serial No. 496,787

4 Claims. (Cl. 200—83)

This invention relates to fluid operated devices and, more particularly, to a sensitive fluid pressure responsive electric switch.

Fluid pressure responsive switches are useful in a number of applications. The most common application is the control of air compressors driven by electric motors or motors which can be controlled by an electrical device. When the accumulator, or pressure tank, of such compressors reaches a desired maximum pressure, a pressure responsive switch is actuated which stops the motor. When sufficient air is used from the pressure tank, the pressure decreases to a selected minimum pressure at which point the pressure responsive switch is again actuated and the compressing motor again resumes its activity.

A similar situation is present in the hydraulic actuating systems of airplanes. In such systems a pump delivers hydraulic fluid under pressure until a desired maximum is reached and a pressure responsive switch either stops the pump, or opens a bypass valve, or contacts a pressure warning light so that a proper manual adjustment may be made. In any event, however, it is very important that the pressure responsive switch maintain its maximum and minimum pressure operating points with extreme accuracy.

Prior devices have frequently failed to have the desired accuracy. This has been found largely attributable to mechanical friction within the pressure responsive device. The most common point of mechanical friction has been in the piston against which the fluid pressure acts and which is moved in accordance with the fluid pressure. The present invention is so constructed that there is little or no friction present in the entire device, a bellows being substituted for the usual piston and spring. By making the bellows out of highly resilient metal, the present invention incorporates, in effect, the piston and spring into a single element. The pressure responsive expansion and contraction of the bellows is transmitted to a leverage arrangement which amplifies the movement for switch actuation, further increasing the sensitivity. The sensitivity is further increased by the use of micro switches, which are well-known in the art and which are snap type switches actuated by total movement ranging from two ten-thousandths of an inch to five or six thousandths.

It is an object of the invention to provide a bellows type pressure responsive electrical switch.

It is another object of the invention to provide a pressure responsive switch wherein the bellows actuates a micro switch.

Still another object of the invention is to provide a pressure responsive switch wherein expansion and contraction of metallic bellows act through a leverage system to actuate the micro switch.

The further object of the invention is to provide a pressure responsive switch of the bellows type, wherein the bellows are preloaded to the operating range of the switch to reduce the fatigue and extend the life of the bellows.

Another object of the invention is to provide a pressure responsive switch which is almost entirely free of friction.

Another object is to provide a pressure responsive switch wherein varying pressure responses are obtained by changing readily removable leaf springs.

It is also an object of the invention to provide a readily adjustable pressure responsive switch.

A feature of the invention is the provision of a friction-free seal to prevent loss of fluid in the event the bellows are broken, which may be by fatigue or excessive pressure, etc.

The drawing forming a part of this specification is an elevation view in full section of a pressure responsive switch embodying the invention.

The device shown in the drawing is adapted to be screwed on to the end of a branch conduit leading from the main fluid system, which may be hydraulic or pneumatic. A tubular shank 10 is internally threaded at both ends, 12 and 14 respectively, and externally threaded at one end as at 16. Placed within shank 10 is a metal bellows 18 which is preferably of brass which is cold rolled by the bellows forming operation to a high tensile strength, giving it considerable resiliency so that it will act as a spring. Soldered to the lower end of bellows 18 is an end cap 20 having threaded and soldered therein a stem 22. Cap 20 rests on a nut 21, engaging threads 12, which nut is slotted at 21a, permitting a preliminary crimping of the nut, which causes it to be locked in any position to which it is screwed. Nut 21 is screwed into place by a wrench contacting a hexagonal hole 25.

Soldered to the upper end of bellows 18 is a flanged collar 23 through which stem 22 passes and which rests upon an aluminum gasket 24 seated on a shoulder 26 on the inside of shank 10. An end cap 28 engages threads 14 and is screwed against collar 23 to hold the bellows 18 in place, the compression of gasket 24 sealing the end of shank 10 from fluid leakage. It will be noted that the stem 22 is annularly recessed near its upper end at 30, and a resilient ring 32 of round cross section is placed in the groove. The groove 30 is considerably longer axially than the width of the ring seal 32 so that the seal 32 may roll freely when its inside diameter is engaged by the moving stem 22. This rolling movement is relatively friction-free and consumes negligible energy.

Shank 10 is threaded into a die cast body 34 and is held in place by a lock nut 36. Formed in the lower part of body 34 are oppositely disposed recesses 36 and 37. These recesses are adapted to receive leaf springs of varying thicknesses, such as leaf spring 38. When thin springs are used, their centers are normally bowed downwardly so that there will be no lost movement in recesses 36 and 37. The upper end of stem 22 touches leaf spring 38 and, when the bellows 18 are compressed by fluid under pressure, stem 22 acts against spring 38 to bend it upwardly in the center. Also formed in the lower left hand corner of body 34 is a circular recess 40 adapted to receive a lever having a cylindrical end portion such as the lever 42. Threaded into lever 42 at a point axially aligned with stem 22 is a screw 44 having a head 46 with serrated edges. Screw 44 may be adjusted by inserting a screwdriver in a hole 45 in housing 34. Screw 44 also passes through a spring steel snap 48 which is normally elastically deformed and therefore prevents screw 44 from rotating after it has been screwed to a given position.

Mounted in the upper part of body 34 by screws 50 is a micro-switch unit 52 having an actuator stem 53 that contacts lever 42. The switch 52 is actuated by a minute movement of stem 53 which may vary from two ten thousandths of an inch to six thousandths, according to the switch selected. A cover 54 is placed on the top of body 34 and an electrical fitting 56 is screwed thereto. Wires 58, which are connected to switch 52, pass through fitting 56.

The device of the drawing is adjusted as follows: Nut 21 is screwed into shank 10 until bellows 18 is considerably compressed. Thereafter the entire device is connected to a fluid pressure system and subjected to the maximum pressure at which it is desired to actuate the switch. Screw 44 is then screwed downwardly, which operation may be performed by inserting a screwdriver through hole 45. Screw 44 is tightened until the micro-switch 52 is actuated by the upward movement of switch stem 53. This fixes the upper range of pressure for the device.

The range of the switch is dependent upon the rate of the leaf spring 38 relative to the total stroke of switch actuator 53. Thus a leaf spring one sixteenth of an inch thick may deflect one thousandth of an inch with a 50 pound change in pressure. If such a leaf spring were used with a micro-switch responsive to a one thousandth movement, the range between "off" and "on" would be 50 pounds. If a range of 150 p. s. i. were desired, the same spring could be used with a micro-switch having a movement of three thousandths of an inch for actuation. Conversely, a one thousandth micro-switch could be used with a spring having the same length and width but about one eighth inch thick for the 150 pound range.

In any event, the maximum upper pressure is the maximum elastic deformation of the spring, and any pressure less than this may be obtained by adjusting screw 44. From the foregoing, it is apparent that any pressure or any range can be obtained by changing the leaf spring 38 or the micro-switch 52 or both.

If the bellows 18 should break due to fatigue or other cause, the fluid under pressure would flow to the inside of the bellows. It cannot escape and waste fluid, however, because of seal 32, the outside of which contacts nut 28 and the inside of which contacts stem 22. The fluid leaking through the bellows strikes seal 32 and forces it to the upper end of its groove 30, where it expands radially under pressure, insuring that there will be no leakage. During normal operation, seal 32 rolls in its groove, the total stroke of stem 22 being less than the axial length of groove 30.

Although the invention has been described with reference to a particular embodiment thereof, it is not limited to this embodiment or otherwise, except by the terms of the following claims.

I claim:

1. A device of the type described comprising: a casing, a leaf spring extending across said casing and supported at each end from the casing so that it is free to flex in the middle, pressure-responsive means for applying a bending force to one side of said leaf spring, a lever extending approximately parallel to said leaf spring on the other side thereof, means pivotally supporting one end of said lever for swinging movement, an adjusting screw on said lever intermediate its ends and adapted to contact with said leaf spring intermediate the ends thereof, and switch means positioned within said casing on the opposite side of said lever from said leaf spring and having an actuating pin adapted to be contacted and actuated by the free end portion of said lever beyond said adjusting screw.

2. A fluid pressure responsive switch comprising: a bellows, means supporting one end of said bellows, means for applying fluid pressure to said bellows to compress its other end toward said one end, resilient means connected to said other end of said bellows for resisting movement thereof in response to pressure, switch means actuated by said resilient means in response to deflection thereof, and adjustable stop means for limiting expansive movement of said other end of said bellows whereby the expansion of the bellows in response to decrease of the fluid pressure thereon is limited to the extent necessary to actuate said switch.

3. A fluid pressure responsive switch comprising: a bellows and means for applying fluid pressure thereto, means anchoring one end of said bellows, a transverse leaf spring anchored at its opposite ends and means connecting the other end of said bellows to said leaf spring adjacent the middle thereof, a switch, and adjustable linkage means interposed between said leaf spring and said switch for actuating the latter, whereby the range of bellows movement is controlled by said leaf spring and varies with the pressure, and the exact pressure at which the switch actuates is determined by said adjustable linkage.

4. A device of the type described comprising: a casing, pressure-responsive means at one end of said casing movable inwardly in response to pressure, switch means in said casing having a movable actuating member, a leaf spring member extending transversely across said casing between said pressure-responsive means and said switch means and adapted to be deflected by inward movement of said pressure-responsive means, and linkage means for transferring deflection movement of said leaf spring to said actuating member, said casing having grooves in opposite sides thereof for slidably receiving and releasably retaining opposite ends of said leaf spring.

JOHN W. WHITE.

REFERENCES CITED

The following references are of record in the file of this patent:

UNITED STATES PATENTS

| Number | Name | Date |
|---|---|---|
| 2,033,417 | Dezotell | Mar. 10, 1936 |
| 2,281,764 | Hanke | May 5, 1942 |
| 1,827,102 | Penn | Oct. 13, 1931 |
| 2,007,384 | Smith | July 9, 1935 |
| 2,071,583 | Schutt | Feb. 23, 1937 |
| 2,078,441 | Carlson | Apr. 27, 1937 |